United States Patent
Rivain et al.

(10) Patent No.: US 10,848,312 B2
(45) Date of Patent: Nov. 24, 2020

(54) ZERO-KNOWLEDGE ARCHITECTURE BETWEEN MULTIPLE SYSTEMS

(71) Applicant: Dashlane, SAS, Paris (FR)

(72) Inventors: Frédéric Rivain, Paris (FR); Guillaume Maron, Paris (FR); Cyril Leclerc, Paris (FR); Alexis Fogel, Levallois-Perret (FR); Rew Islam, Paris (FR)

(73) Assignee: DASHLANE SAS, Paris (FR)

( * ) Notice: Subject to any disclaimer, the term of this patent is extended or adjusted under 35 U.S.C. 154(b) by 291 days.

(21) Appl. No.: 15/891,561

(22) Filed: Feb. 8, 2018

(65) Prior Publication Data
US 2019/0149332 A1   May 16, 2019

Related U.S. Application Data

(60) Provisional application No. 62/585,919, filed on Nov. 14, 2017.

(51) Int. Cl.
*H04L 9/32* (2006.01)
*H04L 9/08* (2006.01)

(52) U.S. Cl.
CPC .......... *H04L 9/3221* (2013.01); *H04L 9/0822* (2013.01); *H04L 9/0838* (2013.01); *H04L 9/0894* (2013.01); *H04L 9/3226* (2013.01)

(58) Field of Classification Search
CPC ... H04L 9/3221; H04L 9/0894; H04L 9/3226; H04L 9/0838; H04L 9/0822
See application file for complete search history.

(56) References Cited

U.S. PATENT DOCUMENTS

| | | |
|---|---|---|
| 5,434,918 A | 7/1995 | Kung et al. |
| 5,495,533 A | 2/1996 | Linehan et al. |
| 5,560,008 A | 9/1996 | Johnson et al. |
| 5,684,951 A | 11/1997 | Goldman et al. |
| 6,044,155 A | 3/2000 | Thomlinson et al. |

(Continued)

OTHER PUBLICATIONS

Apple Technical White Paper, "Best Practices for Deploying FileVault 2", Aug. 2012, OS X 10.7.4, 42 pages.

(Continued)

*Primary Examiner* — Christopher A Revak
(74) *Attorney, Agent, or Firm* — Merchant & Gould P.C.

(57) ABSTRACT

Examples of the present disclosure describe systems and methods relating to a zero-knowledge architecture between multiple systems. In an example, multiple systems may provide an application. User data of the application may be encrypted using a cryptographic key to restrict access to the user data. In some examples, the cryptographic key may not be provided to the multiple systems, thereby providing a zero-knowledge architecture. In order to ensure a user may access the cryptographic key, the cryptographic key may be encrypted using a second cryptographic key. The encrypted representation of the cryptographic key may be provided to a first system, while the second cryptographic key may be provided to a second system. As a result, a user computing device may retrieve both the encrypted representation of the cryptographic key and the second cryptographic key from the first and second systems, respectively, in order to encrypt/decrypt user data.

20 Claims, 5 Drawing Sheets

(56) References Cited

U.S. PATENT DOCUMENTS

| | | | |
|---|---|---|---|
| 7,472,423 | B2 | 12/2008 | DeCenzo et al. |
| 8,006,280 | B1 | 8/2011 | Hildebrand et al. |
| 8,028,329 | B2 | 9/2011 | Whitcomb |
| 8,059,818 | B2 | 11/2011 | Asokan et al. |
| 8,601,600 | B1 | 12/2013 | Shankar |
| 8,990,888 | B2 | 3/2015 | Busser |
| 9,330,245 | B2 | 5/2016 | Maron |
| 10,546,142 | B2* | 1/2020 | Hakhinian .......... G06F 21/6209 |
| 2002/0122553 | A1 | 9/2002 | Kao |
| 2003/0177401 | A1 | 9/2003 | Arnold |
| 2004/0123159 | A1 | 6/2004 | Kerstens et al. |
| 2004/0187018 | A1 | 9/2004 | Owen et al. |
| 2005/0222963 | A1 | 10/2005 | Johnson |
| 2005/0228994 | A1 | 10/2005 | Kasai et al. |
| 2006/0235796 | A1 | 10/2006 | Johnson et al. |
| 2007/0011724 | A1 | 1/2007 | Gonzalez et al. |
| 2007/0192841 | A1 | 8/2007 | Kim |
| 2008/0104709 | A1 | 5/2008 | Averyt et al. |
| 2008/0155276 | A1 | 6/2008 | Chen et al. |
| 2008/0216153 | A1 | 9/2008 | Aaltonen |
| 2009/0235346 | A1 | 9/2009 | Steinberg |
| 2009/0288143 | A1 | 11/2009 | Stebila et al. |
| 2010/0005287 | A1 | 1/2010 | Rollins |
| 2010/0017616 | A1 | 1/2010 | Nichols et al. |
| 2010/0083358 | A1 | 4/2010 | Govindarajan et al. |
| 2010/0100945 | A1 | 4/2010 | Ozzie et al. |
| 2010/0172504 | A1 | 7/2010 | Allen |
| 2010/0174911 | A1 | 7/2010 | Isshiki |
| 2010/0228987 | A1 | 9/2010 | Dinov |
| 2011/0009092 | A1 | 1/2011 | Etchegoyen |
| 2011/0252243 | A1 | 10/2011 | Brouwer |
| 2012/0072979 | A1 | 3/2012 | Cha et al. |
| 2012/0117455 | A1 | 5/2012 | Fogel et al. |
| 2012/0131656 | A1 | 5/2012 | Slaton et al. |
| 2012/0192253 | A1 | 7/2012 | Betsch et al. |
| 2012/0323717 | A1 | 12/2012 | Kirsch |
| 2013/0111217 | A1 | 5/2013 | Kopasz et al. |
| 2013/0205360 | A1 | 8/2013 | Novak |
| 2013/0318581 | A1 | 11/2013 | Counterman |
| 2017/0093805 | A1 | 3/2017 | Proulx |
| 2017/0093839 | A1 | 3/2017 | Whiteside |
| 2018/0013562 | A1* | 1/2018 | Haider .................... G06F 21/14 |
| 2018/0323970 | A1 | 11/2018 | Maron |
| 2019/0356649 | A1* | 11/2019 | Alwen ................ H04L 63/0815 |

OTHER PUBLICATIONS

Dashlane Security Whitepaper, Nov. 2011, https://www.dashlane.com/download/Security-Whitepaper-Final-Nov-2011.pdf., 9 pages.

"LastPass Gets the Green Light from Security Now!'s Steve Gibson", LastPass Blog, (http://blog.lastpass.com/2010/07/lastpass-gets-green-light-from-security.html), Jul. 21, 2010, 11 pages.

Encryption—How does LastPass store my passwords on their website?, Stack Exchange, (http://webapps.stackexchange.com/questions/11361/how-does-lastpass-store-my-passwords-on-their-website), Jan. 16, 2011, 2 pages.

\* cited by examiner

ZERO-KNOWLEDGE ARCHITECTURE BETWEEN MULTIPLE SYSTEMS

CROSS-REFERENCE TO RELATED APPLICATION

This application claims priority to U.S. Provisional Application No. 62/585,919, entitled "Zero-knowledge Architecture Between Multiple Trusted Parties," filed on Nov. 14, 2017, the entire disclosure of which is hereby incorporated by reference in its entirety.

BACKGROUND

In a computing environment, various aspects of an application or user experience may be provided by multiple parties using different systems. As an example, a system of a first party may perform user authentication to an application, while another system of a second party may store user data associated with this application. However, it may be difficult to utilize and/or maintain such a division of roles among multiple systems, which may belong to different parties, for an application while also implementing a zero-knowledge security architecture.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods relating to a zero-knowledge architecture between multiple parties. In an example, multiple systems may be used to provide or implement an application, wherein, in some examples, multiple parties may provide the multiple systems. User data of the application may be encrypted using a cryptographic key so as to restrict access to the user data. In some examples, the cryptographic key may not be provided to the multiple systems, thereby providing a zero-knowledge architecture wherein the one or more systems storing user data may be unable to decrypt the user data.

In order to ensure a user may access the cryptographic key and, in some aspects, user data encrypted with the cryptographic key, the cryptographic key may be encrypted using a second cryptographic key. The encrypted representation of the cryptographic key may be provided to a first system, while the second cryptographic key may be provided to a second system. As a result, it may be possible for a user computing device to retrieve both the second cryptographic key and the encrypted representation of the cryptographic key. The user computing device may then decrypt the cryptographic key, which may in turn be used to decrypt the encrypted user data and/or encrypt other user data. However, neither system may be able to decrypt the encrypted user data, as neither system has access to the decrypted cryptographic key.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

In an example, multiple systems may provide various aspects of an application (e.g., user authentication, data storage, cross-device synchronization capabilities, etc.). In some examples, each system may be provided or controlled by a party, such as a business entity, an individual, or any combination thereof, among other parties. In examples, user data stored by one system may be available to other systems, and vice versa. Accordingly, it may be possible for a system to gain access to, distribute, or modify the user data regardless of whether the user has provided authorization to the system. In another example, such access may be used to provide certain aspects of the application, such that it may be difficult to provide an application having similar functionality without some level of access to and/or sharing of user data among the systems. While examples are discussed herein with respect to an application, it will be appreciated that any of a wide variety of platforms may be provided according to aspects of the present disclosure, including, but not limited to, applications, services and/or software.

By contrast, a "zero-knowledge" architecture may reduce, limit, or remove such access to user data. For example, an application handling sensitive data (e.g., passwords, identification or financial information, etc.) may implement a zero-knowledge architecture, wherein the systems providing the application may no longer have access to user data stored or transmitted by the systems. In an example, the user data may be encrypted by a user device prior to being provided to a system and may later be decrypted by the user device for access by the user. As a result of such encryption techniques, the user data provided to, and/or processed by, multiple systems may be opaque, such that the systems may be unable to access the plaintext content of the user data, and may instead only have access to the encrypted representation of the user data.

In such an example, the user data may be opaque to the systems providing an application because a user device manages the cryptographic keys used to encrypt and decrypt the user data. User data may be deemed "opaque" to a system when it is not possible for the system to generate a plain-text version of the user data (e.g., the system may not have access to the necessary cryptographic key(s) to decrypt the user data). As will be discussed in greater detail below, one or more cryptographic keys used to encrypt the user data may be distributed among the systems, such that the keys may later be retrieved by a user device and used to decrypt the user data. However, given that the keys are distributed among the systems, the user device may be able to decrypt the user data while the systems may be unable to do so, thereby providing a zero-knowledge architecture. Further, in a scenario in which a new user device is set up, it may be possible for the new user device to retrieve the distributed keys from the multiple systems, thereby enabling the new user device to decrypt the user data.

Figure 1:
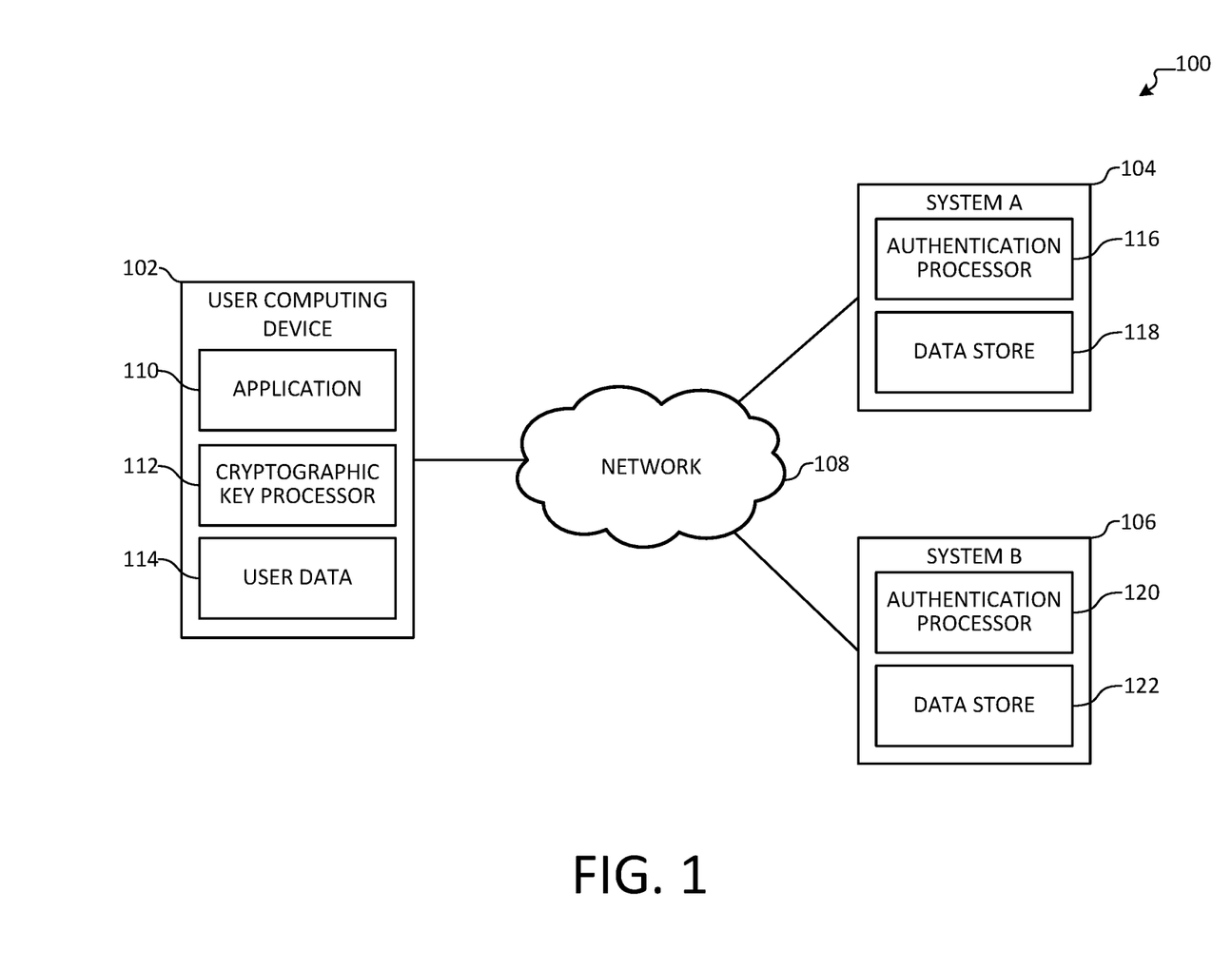
FIG. 1 illustrates an overview of an example system for implementing a zero-knowledge architecture between multiple systems.

FIG. 1 illustrates an overview of an example system 100 for implementing a zero-knowledge architecture between multiple systems. As illustrated, system 100 comprises user computing device 102, system A 104, and system B 106. In an example, user computing device 102 may be a mobile computing device, a tablet computing device, a laptop computing device, a desktop computing device, or a personal computing device, among other computing devices. System A 104 may be a system that provides aspects of an application (e.g., application 110) according to aspects disclosed herein. In an example, system A 104 may use one or more computing devices to provide aspects of the application, including, but not limited to a desktop computing device, a server computing device, or a distributed computing device, among other computing devices. Similarly, system B 106 may be a system that provides aspects of an application (e.g., application 110) according to aspects disclosed herein. In an example, system B 106 may use one or more computing devices to provide aspects of the application, including, but not limited to a desktop computing device, a server computing device, or a distributed computing device, among other computing devices. While system 100 is described with respect to two systems (e.g., system A 104 and system B 106), it will be appreciated that additional or alternative systems may be used.

User computing device 102, system A 104, and system B 106 may be communicatively connected using network 108. In an example, network 108 may be a local area network, a wide area network, or the Internet, among other networks. In some examples, user computing device 102 may communicate with system A 104 and/or system B 106 by way of network 108. Similarly, system A 104 may communicate with system B 106 by way of network 108, or vice versa. While example communications between user computing device 102, system A 104, and system B 106 are discussed herein, it will be appreciated that other examples may comprise alternative communications.

User computing device 102 comprises application 110, cryptographic key processor 112, and user data 114. In an example, application 110 may be a multi-system application, wherein various aspects of application 110 may be provided by system A 104 and system B 106. As an example, system A 104 may perform user authentication and store aspects of a user profile associated with a user of user device 102, while system B 106 may store encrypted user data. It will be appreciated that while an example distribution of aspects is described with respect to application 110, other examples may comprise distributing other aspects among system A 104 and system B 106. In some examples, system A 104 and system B 106 may perform similar functionality, such that an aspect need not be exclusive to one of system A 104 or system B 106.

In an example, cryptographic key processor 112 may be used to generate cryptographic keys and perform other cryptographic functions (e.g., data encryption, data decryption, etc.). In some examples, a cryptographic key may be a symmetric key, or it may be an asymmetric key pair comprised of a public key and a private key. A variety of cryptographic algorithms may be used, including, but not limited to, Advanced Encryption Standard (AES), Data Encryption Standard (DES), Rivest-Shamir-Adleman (RSA), and Elliptic Curve Cryptography (ECC), among others. In another example, application 110 may use cryptographic key processor 112 to generate one or more cryptographic keys used for encrypting user data, which may be stored as user data 114.

In an example, user data 114 may comprise encrypted and/or plain-text user data for application 110. User data 114 may comprise any of a variety of data, including, but not limited to, passwords, messages, text data, image data, video data, documents, or presentations. In some examples, user data 114 may comprise cached data for application 110, wherein the data is cached from system A 104 and/or system B 106. In other examples, user data 114 may comprise synchronized data for application 110, wherein at least a part of user data 114 is synchronized between user computing device 102 and another user computing device (not pictured) via system A 104 and/or system B 106.

System A 104 comprises authentication processor 116 and data store 118. In an example, authentication processor 116 may perform user authentication, such that a user may be authenticated in order to gain access to data associated with the user and/or user device, which may be stored by data store 118. In some examples, authentication processor 116 may use any of a variety of authentication mechanisms, including, but not limited to, credential-based authentication (e.g., based on username and password, cryptographic key, etc.), biometric authentication, proof of ownership (e.g., based on sending a token to an account of the user), or multi-factor authentication. It will be appreciated that other authentication mechanisms may be used according to aspects disclosed herein.

Data store 118 may store user data, which may be encrypted according to aspects disclosed herein. In some examples, data store 118 may store a combination of encrypted data and unencrypted data, such that at least a part of the data associated with a user may be unencrypted. As an example, data store 118 may store encrypted user data (e.g., as may be encrypted by application 110 of user computing device 102) in combination with unencrypted user data, such as profile information or contact information, among other data. In another example, the encrypted and/or unencrypted user data may further comprise one or more cryptographic keys associated with the user for system A 104.

System B 106 comprises authentication processor 120 and data store 122. In an example, authentication processor 120 may perform user authentication, such that a user may be authenticated in order to gain access to data associated with the user and/or user device 102, which may be stored by data store 122. In some examples, authentication processor 120 may use any of a variety of authentication mechanisms, including, but not limited to, credential-based authentication (e.g., based on username and password, cryptographic key, etc.), biometric authentication, proof of ownership (e.g., based on sending a token to an account of the user), or multi-factor authentication. It will be appreciated that other authentication mechanisms may be used according to aspects disclosed herein.

Data store 122 may store user data, which may be encrypted according to aspects disclosed herein. In some examples, data store 122 may store a combination of encrypted data and unencrypted data, such that at least a part of the data associated with a user may be unencrypted. As an example, data store 122 may store encrypted user data (e.g., as may be encrypted by application 110 of user computing device 102) in combination with unencrypted user data, such as profile information or contact information, among other data. In another example, the encrypted and/or unencrypted user data may further comprise one or more cryptographic keys associated with the user for system B 106.

In an example, application 110 may perform an initialization operation, wherein cryptographic key processor 112 may be used to generate a first cryptographic key. The first cryptographic key may be used to encrypt (and decrypt) user data of application 110 on user computing device 102, such that the user data may be encrypted and stored as user data 114, at system A 104 in data store 118, and/or at system B 106 in data store 122. In some examples, system A 104 and system B 106 may not have access to the unencrypted first cryptographic key, such that the encrypted user data may be opaque to system A 104 and system B 106, thereby implementing a zero-knowledge architecture for application 110.

The initialization process may comprise generating a second cryptographic key using cryptographic key processor 112, which may be used to generate an encrypted representation of the first cryptographic key. In such an example, the encrypted representation of the first cryptographic key may be communicated to system A 104, while the second cryptographic key may be communicated to system B 106. As a result, it may be possible for a user computing device (e.g., user computing device 102) to retrieve both the encrypted representation of the first cryptographic key (e.g., by authenticating with system A 104) and the second cryptographic key (e.g., by authenticating with system B 106), so as to generate a decrypted representation of the first cryptographic key. The decrypted representation of the first cryptographic key may then be used to decrypt the encrypted user data. By contrast, system A 104 and system B 106 may be unable to decrypt the encrypted user data (e.g., as may be stored by data store 118 and data store 122, respectively), given that the encrypted representation of the first cryptographic key and the second cryptographic key are stored separately. In some examples, the first cryptographic key may be retained by user computing device 102, such that it may be possible for application 110 to encrypt and/or decrypt user data. In other examples, the first cryptographic key may not be retained by user computing device 102, such that the second cryptographic key and the encrypted representation of the first cryptographic key may be accessed by user computing device 102 in order to generate a decrypted representation of the cryptographic key prior to encrypting and/or decrypting user data.

It will be appreciated that other techniques may be used to achieve an environment in which system A 104 and system B 106 may be unable to decrypt the encrypted user data, including, but not limited to, dividing the first cryptographic key into a plurality of subparts, and distributing the subparts among system A 104 and system B 106, such that neither system A 104 nor system B 106 has access to the entire cryptographic key. Further, while system 100 is described with respect to two systems (e.g., system A 104 and system B 106), it will be appreciated that aspects disclosed herein may be applied to any number of systems.

Figure 2:
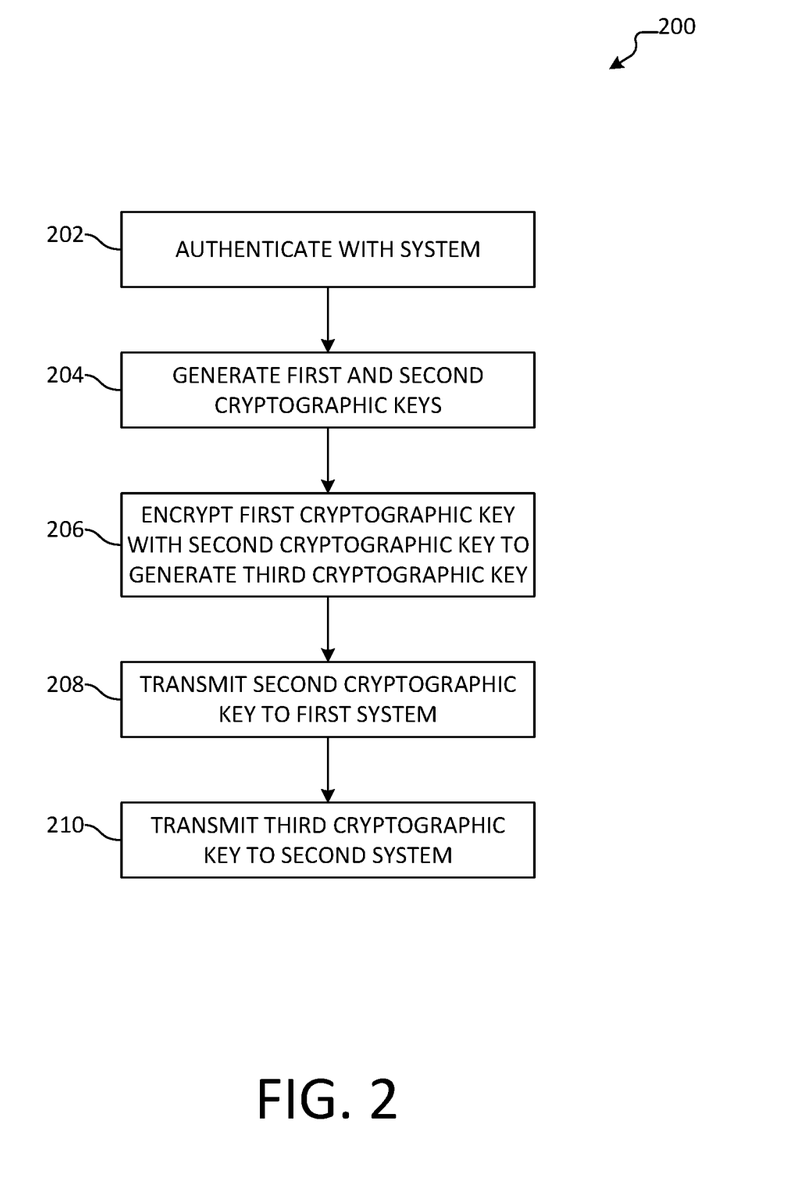
FIG. 2 illustrates an overview of an example method for an initialization operation for an application implementing a zero-knowledge architecture between multiple systems.

FIG. 2 illustrates an overview of an example method 200 for an initialization operation for an application implementing a zero-knowledge architecture between multiple systems. In an example, method 200 may be performed by a user computing device, such as user computing device 102 in FIG. 1. In another example, method 200 may be performed in order to initialize an application provided by multiple systems, such as application 110 in FIG. 1. While method 200 is discussed with respect to an application, it will be appreciated that any of a wide variety of technologies may be provided according to aspects of the present disclosure, including, but not limited to, applications, platforms, and/or services.

Method 200 begins at operation 202, where system authentication may occur. In an example, authenticating with a system may comprise any of a variety of authentication mechanisms, including, but not limited to, credential-based authentication (e.g., based on username and password, cryptographic key, etc.), biometric authentication, proof of ownership (e.g., based on sending a token to an account of the user), or multi-factor authentication. In another example, authentication may comprise undergoing a registration operation, wherein a new user account may be generated for a user with the system. In some examples, operation 202 may comprise authenticating with multiple systems.

Moving to operation 204, a first cryptographic key and a second cryptographic key may be generated. In an example, the cryptographic keys may be generated by a cryptographic key processor, such as cryptographic key processor 112 in FIG. 1. In some examples, each of the first and second cryptographic keys may be a symmetric key, or it may be an asymmetric key pair comprised of a public key and a private key, or any combination thereof. A variety of cryptographic algorithms may be used, including, but not limited to, Advanced Encryption Standard (AES), Data Encryption Standard (DES), Rivest-Shamir-Adleman (RSA), and Elliptic Curve Cryptography (ECC), among others.

At operation 206, the first cryptographic key may be encrypted with the second cryptographic key, thereby generating a third cryptographic key. Flow progresses to operation 208, where the second cryptographic key may be transmitted to the first system. Accordingly, the first system may store the second cryptographic key, which may later be used to decrypt the third cryptographic key in order to regain access to the first cryptographic key. However, given that the second cryptographic key is not used to encrypt user data, the first system is unable to decrypt the encrypted user data, thereby maintaining a zero-knowledge architecture.

Moving to operation 210, the third cryptographic key may be transmitted to the second system. Accordingly, the second system may store the third cryptographic key, which may later be decrypted using the second cryptographic key in order to regain access to the first cryptographic key. However, given that the third cryptographic key is not used to encrypt user data, the second system is unable to decrypt the encrypted user data, thereby maintaining a zero-knowledge architecture. It will be appreciated that while method 200 is discussed with respect to two systems, additional systems may be used. As an example, a fourth cryptographic key for a third system may be used to further encrypt the third cryptographic key, such that both the second cryptographic key and fourth cryptographic key may be needed in order to regain access to the first cryptographic key. Flow terminates at operation 210.

Figure 3:
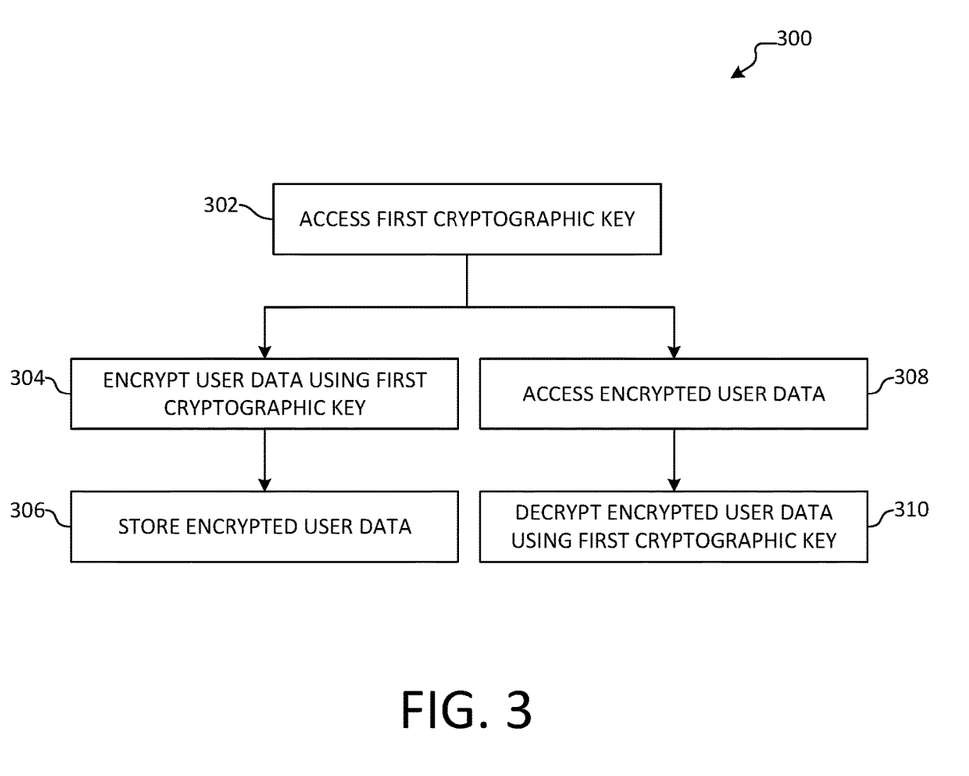
FIG. 3 illustrates an overview of an example method for the operation of an application implementing a zero-knowledge architecture between multiple systems.

FIG. 3 illustrates an overview of an example method 300 for the operation of an application implementing a zero-knowledge architecture between multiple systems. In an example, method 300 may be performed by a user computing device, such as user computing device 102 in FIG. 1. In another example, method 300 may be performed by an application (e.g., application 110 in FIG. 1) when generating, modifying, and/or accessing user data. While method 300 is discussed with respect to an application, it will be appreciated that any of a wide variety of technologies may be provided according to aspects of the present disclosure, including, but not limited to, applications, platforms, and/or services.

Method 300 begins at operation 302, where a first cryptographic key may be accessed. In an example, the first cryptographic key may be accessed from a local data store (e.g., from a storage device, a trusted platform module, a keychain, etc.) or from a remote data store. In some examples, accessing the first cryptographic key may comprise communicating with one or more systems by performing at least a part of method 400 as is discussed below with respect to FIG. 4. For example, the first cryptographic key may be accessed by communicating with a first system storing a second cryptographic key and a second system storing an encrypted representation of the first cryptographic key (e.g., a third cryptographic key, as discussed above in FIG. 2). In some examples, authentication may be performed with the first system and/or second system prior to gaining access to the cryptographic keys. The second cryptographic key may then be used to decrypt the encrypted representation of the first cryptographic key. In another example, at least one of the second cryptographic key and the encrypted representation of the first cryptographic key may be stored locally, such that the system associated with the locally-stored key need not be accessed when accessing the first cryptographic key. It will be appreciated that similar techniques may be applied to scenarios in which additional systems are involved.

Operation 302 is illustrated as branching to operations 304 and 308. In an example, one or both branches may be performed during the operation of the application. In some examples, operations 304-306 may be performed contemporaneously with operations 308-310, or they may be performed sequentially, or any variation thereof.

With reference first to operations 304-306, flow progresses to operation 304, where user data may be encrypted using the first cryptographic key. Encrypting the user data may comprise generating an encrypted representation of at least a part of the user data using the first cryptographic key. In an example, the user data may comprise any of a variety of data, including, but not limited to, passwords, messages, text data, image data, video data, documents, or presentations. In another example, the user data may be received as user input. At operation 306, the encrypted user data may be stored. In some examples, storing the encrypted user data may comprise storing at least a part of the encrypted data locally and/or communicating at least a part of the encrypted data to one or more systems. In some examples, flow terminates at operation 306. In other examples, one or more operations of method 300 may be performed any number of times during the operation of an application.

Turning now to operations 308-310, encrypted user data may be accessed at operation 308. In some examples, accessing the encrypted user data may comprise accessing the encrypted user data from a local data store and/or from a remote data store, such as a data store provided by a system (e.g., data stores 118 and/or 122 in FIG. 1). In some examples, only a part of the encrypted user data may be accessed. Flow progresses to operation 310, where the encrypted user data may be decrypted using the first cryptographic key. As described above, the first cryptographic key may be stored locally and/or remotely according to aspects disclosed herein. Flow terminates at operation 310. In another example, operations of method 300 may be performed any number of times during the operation of an application.

Figure 4:
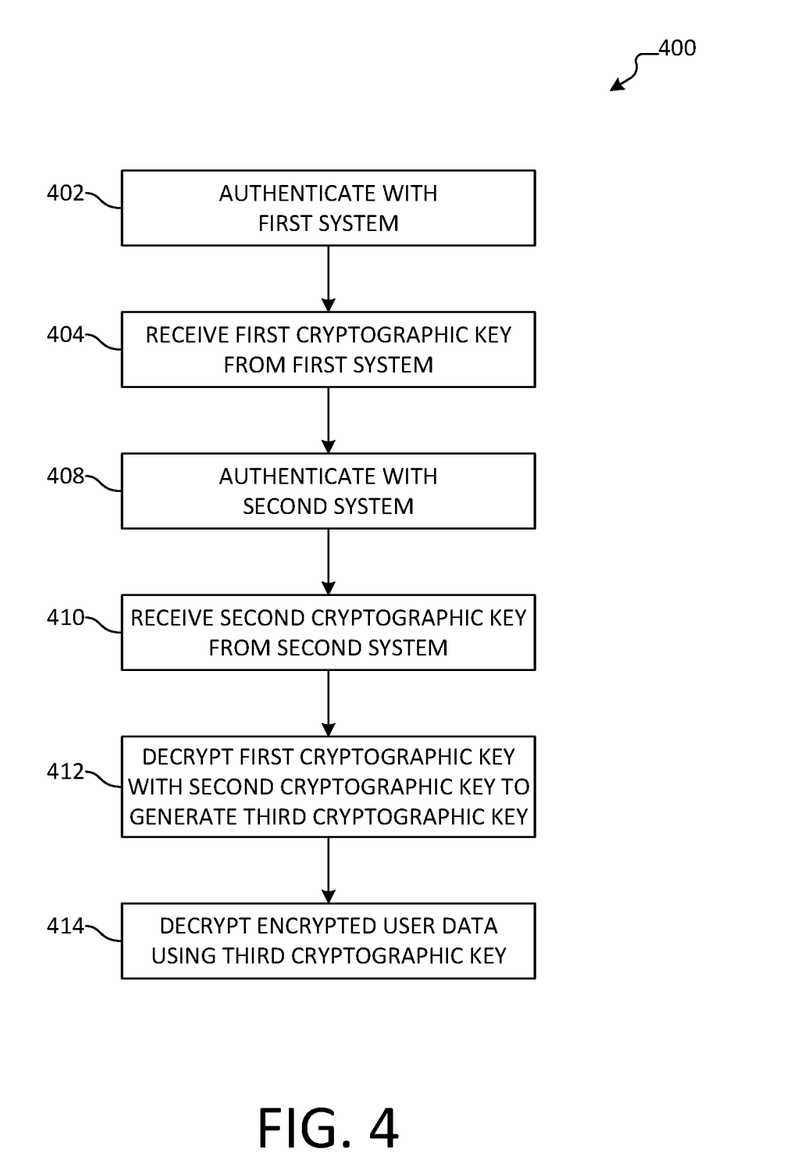
FIG. 4 illustrates an overview of an example method for decrypting user data for an application implementing a zero-knowledge architecture between multiple systems.

FIG. 4 illustrates an overview of an example method 400 for decrypting user data for an application implementing a zero-knowledge architecture between multiple systems. In an example, method 400 may be performed by a user computing device, such as user computing device 102 in FIG. 1. In another example, method 400 may be performed by an application, such as application 110 in FIG. 1. In some examples, method 400 may be performed by a user computing device when initially accessing user data of an application (e.g., as a result of a user setting up a new device with the application). While method 400 is discussed with respect to an application, it will be appreciated that any of a wide variety of technologies may be provided according to aspects of the present disclosure, including, but not limited to, applications, platforms, and/or services. Further, it will be appreciated that while method 400 is discussed with respect to two systems, similar techniques may be applied to any number of systems.

Method 400 begins at operation 402, where authentication with a first system may occur. In an example, authenticating with the first system may comprise any of a variety of authentication mechanisms, including, but not limited to, credential-based authentication (e.g., based on username and password, cryptographic key, etc.), biometric authentication, proof of ownership (e.g., based on sending a token to an account of the user), or multi-factor authentication. As an example, a username and password may be used to authenticate with the first system, such that the first system may identify information associated with the username.

At operation 404, a first cryptographic key may be received from the first system. In some examples, the first cryptographic key may be determined based on the authentication information provided to the first system. As described above, the first cryptographic key may be a symmetric key, or it may be at least part of an asymmetric key pair comprised of a public key and a private key, or any combination thereof.

Flow progresses to operation 408, where authentication with a second system may occur. In an example, authenticating with the second system may comprise any of a variety of authentication mechanisms, including, but not limited to, credential-based authentication (e.g., based on username and password, cryptographic key, etc.), biometric authentication, proof of ownership (e.g., based on sending a token to an account of the user), or multi-factor authentication. In some examples, the authentication mechanism used by the second system may be similar to or different from the authentication mechanism used by the first system. As an example, a token may be communicated to a user device of a user, such that the user may provide the received token to the second system, thereby proving possession of the user device. In an example, use of different authentication mechanisms for the first system and the second system may provide increased security as compared to using a similar authentication mechanism.

Moving to operation 410, a second cryptographic key may be received from the second system. In some examples, the second cryptographic key may be determined based on the authentication information provided to the second system. In other examples, an indication may be received from the first system providing an indication as to the cryptographic key that should be provided (e.g., directly from the first system, via a user device, etc.). As described above, the second cryptographic key may be a symmetric key, or it may be at least part of an asymmetric key pair comprised of a public key and a private key, or any combination thereof.

At operation 412, the first cryptographic key may be decrypted using the second cryptographic key, thereby generating a third cryptographic key. It will be appreciated that, in some examples, additional cryptographic keys may be received from additional systems, which may be used to further decrypt the cryptographic key in order to obtain the cryptographic key that was used to encrypt user data. In other examples, subparts of the same cryptographic key may be accessed from multiple systems, such that, rather than decrypting a cryptographic key, the subparts may be combined in order to yield a cryptographic key useable to decrypt user data.

Moving to operation 414, the encrypted user data may be decrypted using the third cryptographic key. In some examples, the encrypted user data may be stored locally and/or remotely. As an example, at least a part of the encrypted user data may be accessed from the first system and/or the second system. In another example, the encrypted user data may be cached locally on the device. Flow terminates at operation 414.

Figure 5:
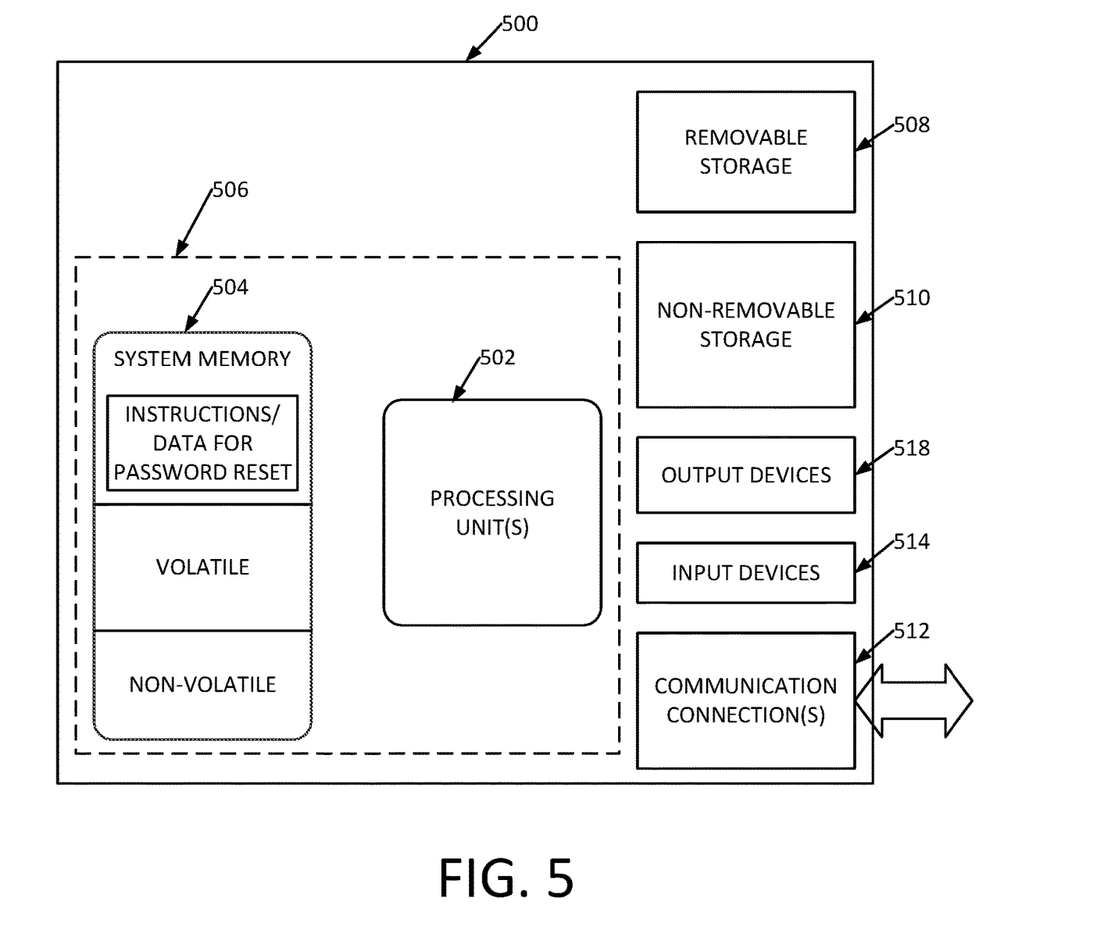
FIG. 5 illustrates an example of a suitable operating environment in which one or more of the present embodiments may be implemented.

FIG. 5 illustrates an example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically may include at least one processing unit 502 and memory 504. Depending on the exact configuration and type of computing device, memory 504 (storing, among other things, zero-knowledge application module(s), e.g., one or more cryptographic keys, encrypted user data, encrypted backup data, one or more encrypted local ciphering keys, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as a keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 may include at least some form of computer readable media. The computer readable media may be any available media that can be accessed by processing unit 502 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 504, such as application 110 in FIG. 1. While executing on the processing unit 502, program modules 508 (e.g., applications, Input/Output (I/O) management, and other utilities) may perform processes including, but not limited to, one or more of the stages of the operational methods described herein such as the methods illustrated in FIGS. 2-4, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 500 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

As will be understood from the foregoing disclosure, one aspect of the technology relates to a system comprising: at least one processor; and memory storing instructions that, when executed by the at least one processor, cause the system to perform a set of operations. The set of operations comprises: generating, at a computing device, a first cryptographic key and a second cryptographic key; encrypting the first cryptographic key using the second cryptographic key to generate a third cryptographic key; transmitting the second cryptographic key to a first system and the third cryptographic key to a second system; generating encrypted user data using the first cryptographic key; based on determining to decrypt the encrypted user data, accessing the third cryptographic key and the second cryptographic key; generating a decrypted first cryptographic key by decrypting the third cryptographic key using the second cryptographic key; and decrypting at least a part of the encrypted user data using the decrypted first cryptographic key. In an example, the first cryptographic key is not retained by the computing device, and accessing the third cryptographic key and the second cryptographic key comprises: communicating with the second system to retrieve the third cryptographic key; and communicating with the first system to retrieve the second cryptographic key. In another example, communicating with the second system comprises authenticating a user of the computing device with the second system. In a further example, communicating with the first system comprises authenticating with the first system. In yet another example, at least one of the second cryptographic key and the third cryptographic key are accessed at the computing device. In a further still example, the set of operations further comprises: transmitting at least a part of the encrypted user data to at least one of the first system and the second system. In an example, decrypting at least a part of the encrypted user data comprises accessing the encrypted user data from at least one of the first system and the second system.

In another aspect, the technology relates to a method for decrypting encrypted user data for an application. The method comprises: authenticating with a first system; receiving, at a computing device, a first cryptographic key from the first system; authenticating with a second system; receiving a second cryptographic key from the second system; accessing encrypted user data associated with the application; decrypting the first cryptographic key using the second cryptographic key to generate a decrypted cryptographic key; and decrypting the encrypted user data using the decrypted cryptographic key. In an example, the encrypted user data is accessed from at least one of the first system and the second system. In another example, authenticating with the first system comprises using a different authentication mechanism than authenticating with the second system. In a further example, the method further comprises: retaining at least one of the first cryptographic key and the second cryptographic key at the computing device. In yet another example, the method further comprises: authenticating with a third system; receiving a third cryptographic key from the third system; and further decrypting the decrypted cryptographic key using the third cryptographic key. In a further still example, the method further comprises: generating additional encrypted user data, wherein the additional encrypted user data is encrypted using the decrypted cryptographic key; and transmitting at least a part of the additional encrypted data to at least one of the first system and the second system.

In a further aspect, the technology relates to a method for initializing an application provided by at least a first system and a second system. The method comprises: generating, at a computing device, a first cryptographic key and a second cryptographic key; encrypting the first cryptographic key using the second cryptographic key to generate a third cryptographic key; transmitting the second cryptographic key to the first system and the third cryptographic key to the second system; generating encrypted user data using the first cryptographic key; based on determining to decrypt the encrypted user data, accessing the third cryptographic key and the second cryptographic key; generating a decrypted first cryptographic key by decrypting the third cryptographic key using the second cryptographic key; and decrypting at least a part of the encrypted user data using the decrypted first cryptographic key. In an example, the first cryptographic key is not retained by the computing device, and accessing the third cryptographic key and the second cryptographic key comprises: communicating with the second system to retrieve the third cryptographic key; and communicating with the first system to retrieve the second cryptographic key. In another example, communicating with the second system comprises authenticating a user of the computing device with the second system. In a further example, communicating with the first system comprises authenticating with the first system. In yet another example, at least one of the second cryptographic key and the third cryptographic key are accessed at the computing device. In a further still example, the method further comprises transmitting at least a part of the encrypted user data to at least one of the first system and the second system. In another example, decrypting at least a part of the encrypted user data comprises accessing the encrypted user data from at least one of the first system and the second system.

This disclosure described some aspects of the present technology with reference to the accompanying drawings, in which only some of the possible embodiments were shown. Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A system comprising:
at least one processor; and
memory storing instructions that, when executed by the at least one processor, cause the system to perform a set of operations, the set of operations comprising:
generating, at a computing device, a first cryptographic key and a second cryptographic key;
encrypting the first cryptographic key using the second cryptographic key to generate a third cryptographic key;
transmitting the second cryptographic key to a first system and the third cryptographic key to a second system;
generating encrypted user data using the first cryptographic key;
based on determining to decrypt the encrypted user data, accessing the third cryptographic key and the second cryptographic key;
generating a decrypted first cryptographic key by decrypting the third cryptographic key using the second cryptographic key; and
decrypting at least a part of the encrypted user data using the decrypted first cryptographic key.

2. The system of claim 1, wherein the first cryptographic key is not retained by the computing device, and wherein accessing the third cryptographic key and the second cryptographic key comprises:
communicating with the second system to retrieve the third cryptographic key; and
communicating with the first system to retrieve the second cryptographic key.

3. The system of claim 2, wherein communicating with the second system comprises authenticating a user of the computing device with the second system.

4. The system of claim 2, wherein communicating with the first system comprises authenticating with the first system.

5. The system of claim 1, wherein at least one of the second cryptographic key and the third cryptographic key are accessed at the computing device.

6. The system of claim 1, wherein the set of operations further comprises:
transmitting at least a part of the encrypted user data to at least one of the first system and the second system.

7. The system of claim 6, wherein decrypting at least a part of the encrypted user data comprises accessing the encrypted user data from at least one of the first system and the second system.

8. A method for decrypting encrypted user data for an application, comprising:
authenticating with a first system;
receiving, at a computing device, a first cryptographic key from the first system;
authenticating with a second system;
receiving a second cryptographic key from the second system;
accessing encrypted user data associated with the application;
decrypting the first cryptographic key using the second cryptographic key to generate a decrypted cryptographic key; and
decrypting the encrypted user data using the decrypted cryptographic key.

9. The method of claim 8, wherein the encrypted user data is accessed from at least one of the first system and the second system.

10. The method of claim 8, wherein authenticating with the first system comprises using a different authentication mechanism than authenticating with the second system.

11. The method of claim 8, further comprising:
retaining at least one of the first cryptographic key and the second cryptographic key at the computing device.

12. The method of claim 8, further comprising:
authenticating with a third system;
receiving a third cryptographic key from the third system; and
further decrypting the decrypted cryptographic key using the third cryptographic key.

13. The method of claim 8, further comprising:
generating additional encrypted user data, wherein the additional encrypted user data is encrypted using the decrypted cryptographic key; and
transmitting at least a part of the additional encrypted data to at least one of the first system and the second system.

14. A method for initializing an application provided by at least a first system and a second system, comprising:
generating, at a computing device, a first cryptographic key and a second cryptographic key;
encrypting the first cryptographic key using the second cryptographic key to generate a third cryptographic key;
transmitting the second cryptographic key to the first system and the third cryptographic key to the second system;
generating encrypted user data using the first cryptographic key;
based on determining to decrypt the encrypted user data, accessing the third cryptographic key and the second cryptographic key;
generating a decrypted first cryptographic key by decrypting the third cryptographic key using the second cryptographic key; and
decrypting at least a part of the encrypted user data using the decrypted first cryptographic key.

15. The method of claim 14, wherein the first cryptographic key is not retained by the computing device, and wherein accessing the third cryptographic key and the second cryptographic key comprises:
communicating with the second system to retrieve the third cryptographic key; and
communicating with the first system to retrieve the second cryptographic key.

16. The method of claim 15, wherein communicating with the second system comprises authenticating a user of the computing device with the second system.

17. The method of claim 15, wherein communicating with the first system comprises authenticating with the first system.

18. The method of claim 14, wherein at least one of the second cryptographic key and the third cryptographic key are accessed at the computing device.

19. The method of claim 14, further comprising transmitting at least a part of the encrypted user data to at least one of the first system and the second system.

20. The method of claim 19, wherein decrypting at least a part of the encrypted user data comprises accessing the encrypted user data from at least one of the first system and the second system.

* * * * *